(12) United States Patent
Galun et al.

(10) Patent No.: US 7,466,727 B2
(45) Date of Patent: Dec. 16, 2008

(54) PASSIVE Q-SWITCH LASER

(75) Inventors: Ehud Galun, Rehovot (IL); Efrat Lifshitz, Haifa (IL); Marina Sirota, Rehovot (IL); Vladimir Krupkin, Rishon Lezion (IL); Aldona Sashchiuk, Nazareth-Elite (IL)

(73) Assignees: ELOP Electro-Optics Industries Ltd., Rehovat (IL); Technion Research and Development Foundation Ltd., Haifa (IL)

( * ) Notice: Subject to any disclaimer, the term of this patent is extended or adjusted under 35 U.S.C. 154(b) by 81 days.

(21) Appl. No.: 11/582,133

(22) Filed: Oct. 16, 2006

(65) Prior Publication Data
US 2007/0076770 A1 Apr. 5, 2007

Related U.S. Application Data

(63) Continuation of application No. 11/132,037, filed on May 17, 2005, now abandoned, which is a continuation-in-part of application No. PCT/IL03/00997, filed on Nov. 25, 2003.

(60) Provisional application No. 60/429,320, filed on Nov. 26, 2002.

(51) Int. Cl.
*H01S 3/11* (2006.01)
*H01S 3/113* (2006.01)

(52) U.S. Cl. .......................... 372/10; 372/11
(58) Field of Classification Search ............... 372/10, 372/53, 4, 9, 11
See application file for complete search history.

(56) References Cited

U.S. PATENT DOCUMENTS

| 4,738,798 A | 4/1988 | Mahler |
| 5,162,939 A | 11/1992 | Herron et al. |
| 6,444,143 B2 | 9/2002 | Bawendi et al. |

FOREIGN PATENT DOCUMENTS

EP 0918245 A1 5/1999

OTHER PUBLICATIONS

J. F. Phillips, T. Toepfer, H. Ebendorff-Heidepriem et al., "Diode-pumped erbium-ytterbium-glass laser passively Q-switched with a PbS semiconductor quantum-dot doped glass", Applied Physics, vol. 72, 2001, pp. 175-178, XP002291194.
C. Murray et al., IBM J. Res. And Dev., vol. 45, No. 1, Jan. 1, 2001, pp. 47-56, XP002295268.
International Search Report for parent PCT Application No. PCT/IL03/00997, Oct. 7, 2004 (6 pages).

(Continued)

*Primary Examiner*—Armando Rodriguez
(74) *Attorney, Agent, or Firm*—Edwards Angell Palmer & Dodge LLP

(57) ABSTRACT

A passive Q-switch for a laser system, and a method for its production. The laser is operative at near infrared wavelength region, including the eye-safe region. The Q-switch includes a saturable absorber based on IV-VI semiconductor nanocrystals (NCs), embedded in a polymer matrix. The NCs preferably include lead selenide, lead sulfide, or lead selenide sulfide. The NCs may be surface passivated, and may feature a PbSe/PbS core-shell configuration.

40 Claims, 9 Drawing Sheets

OTHER PUBLICATIONS

R. Wu, S. Jiang, M. Myers, J. Myers, S. Hamlin—SPIE, vol. 2379, "High Repetition Rate Passive Q-Switched Er:Glass Laser Using $U^{2+}:CaF_2$ Saturable Absorbers", 1995 (5 pages).

R. Wu, J, Meyers, S. Hamlin—Presentation at the OSA Advanced Solid State Laser Conference (ASSL), "Comparative results of diode pumped Er:Glass Lasers Q-switched with BBO Pockel's cell and FTIR methods", 1998 (3 pages).

A.M. Malyarevich et al., "PbS(Se) Quantum Dot Doped Glass Applications as Laser Passive Q-Switches", Phys. Stat. Sol. (b) 224, No. 1, 253-256 (2001).

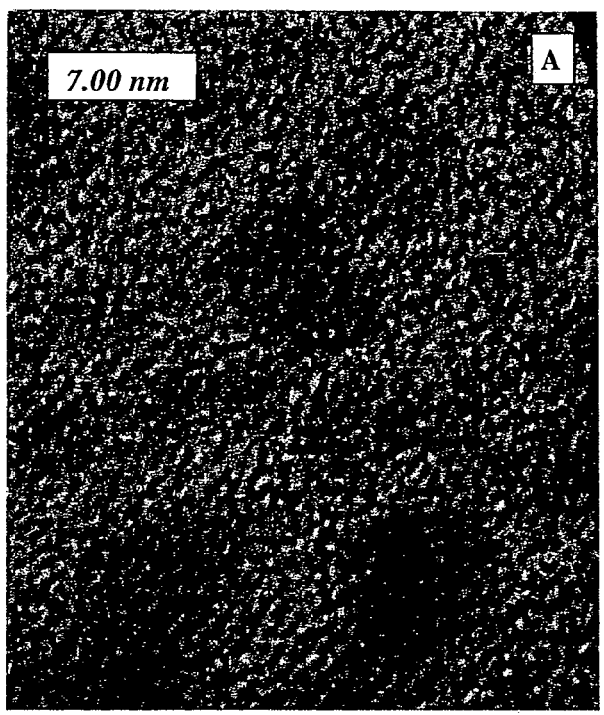
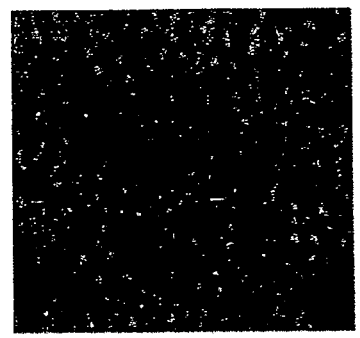
FIG. 3B
FIG. 3A
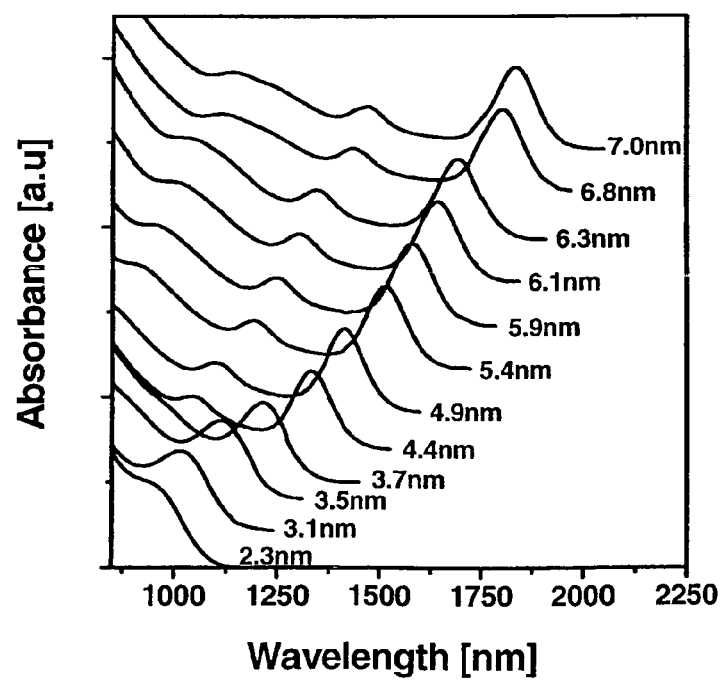
FIG. 4

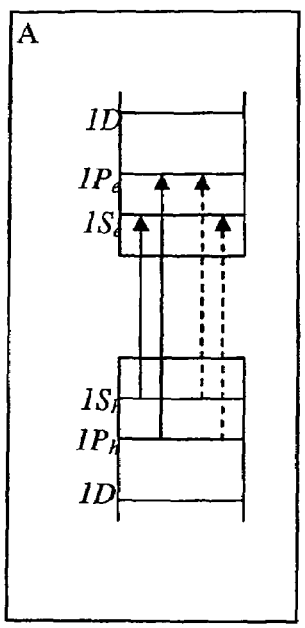
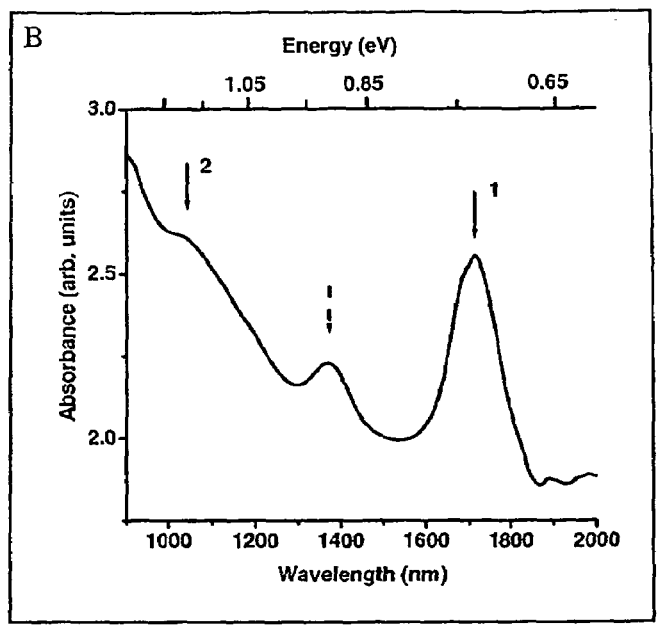
FIG. 5A  FIG. 5B
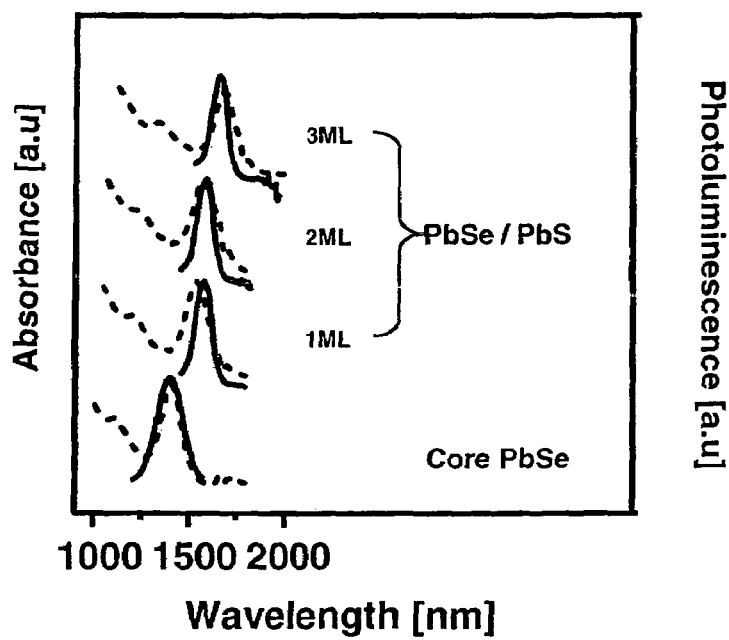
FIG. 6

PASSIVE Q-SWITCH LASER

CROSS-REFERENCE INFORMATION

This application is a continuation of U.S. patent application Ser. No. 11/132,037 filed May 17, 2005, now abandoned which is a continuation-in-part of PCT international application number PCT/IL2003/000997, filed Nov. 25, 2003, which was published as International Publication Number WO. 2004/049522 on Jun. 10, 2004, and which designates the United States and claims priority to provisional U.S. patent application Ser. No. 60/429,320, filed Nov. 26, 2002, the entirety of all of which are incorporated herein by reference.

FIELD OF THE DISCLOSED TECHNIQUE

The disclosed technique relates to laser systems in general, and to a semiconductor nanocrystal for use in a passively Q-switched laser system, in particular.

BACKGROUND OF THE DISCLOSED TECHNIQUE

Infrared (IR) lasers, which operate in the wavelength range of 700-4,000 nm, and in the 1,300-3,000 nm in particular, have recently become popular in laser radar, three-dimensional scanning, targeting, and communication applications. Such applications require the laser to operate under Q-switching, which can generate a laser pulse with duration on the order of tens of nanoseconds, and a peak power on the order of a megawatt. Q-switches are described by R. Wu, S. Jiang, M. Myers, J. Myers, S. Hamlin, SPIE, Vol. 2379, *Solid State Lasers and Nonlinear Crystals,* 1995. A Q-switch has the effect of a shutter moving rapidly in and out of the light beam, altering the normal "Q factor". The Q factor represents the energy storing efficiency of the resonator, namely the ratio of stored energy to dissipated energy. The Q switch maintains a low Q factor until a high level of energy is stored within the cavity. When the normal Q factor is restored, the laser energy is released in the form of a very short pulse of high intensity.

A Q-switch can be an active or a passive device. Active Q-switches utilize opto-mechanical techniques (e.g., rotating prisms), electro-optical techniques (e.g., beta-$BaB_2O_4$ (BBO) crystal, nonlinear optical crystal or Frustrated Total Internal Reflection (FTIR) methods), acousto-optical techniques (e.g., a change in the light Bragg deflection upon the application of sound wave) and magneto-optical techniques (e.g., a change in optical properties of a crystal in the presence of an external magnetic field). Further elaboration can be found in R. Wu, J. Myers, S. Hamlin, *Presentation at the OSA Advanced Solid-State Laser Conference, (ASSL)* 1998. These Q-switches are controlled or driven by external forces which are not entirely based on optics, and therefore usually have a relatively slow operation time and a limited bandwidth. Active Q-switches require external electronics, additional optics, and magnetic field or acoustic wave accessories, which increase the physical size and can also add expenditures to the cost of the switching device.

The operation of a passive Q-switch is due to the intrinsic properties of the material. As a result, a passive Q-switch produces a fast response time (on the order of picoseconds-nanoseconds) and a relatively high output power. Various applications require reliable, simple and compact laser systems with short and powerful laser pulses. The technique of passive Q-switching is both compact and simple, because it requires only a saturable absorber introduced in the laser cavity, without any auxiliary electronics. A saturable absorber is a material whose absorption coefficient drops at high levels of incident radiation. Since such a switch has no external control, it consequently has a high capability for integration, in terms of manufacturing, operation, fabrication cost, system size, and weight.

Various materials have been shown to operate as passive Q-switches in the eye-safe wavelength region. For instance, the fluorides ($Er^{3+}$:$CaF_2$, $Er^{3+}$:$Ca_5(PO_4)_3$, $U^{2+}$:$CaF_2$, $U^{2+}$:$BaF_2$, $U^{2+}$:$SrF_2$) based on $Co^{2+}$ ions doped semiconductors, single crystals, and glass ceramics, have been tested as a saturable absorber operating at 1.54 µm, and demonstrated sufficient performance as a passive Q-switch.

Semiconductor crystals can function as a saturable absorber over wide spectral regimes, when the size of the crystals is in the nanometer range. PbS and PbSe nanoscaled crystals embedded in phosphate and silicate glasses were experimentally employed for passive Q-switching of Erbium doped glass (Er:glass) laser systems. Such materials are described in J. F. Philipps, T. Topfer, H. Ebendorff-Heidepriem, D. Ehrt, R. Sauerbrey, N. F. Borrelli, *Appl. Phys. B* 72, 175-178 (2001); A. M. Malyarevich, V. G. Savitsky, I. A. Denisov, P. V. Prokoshin, K. V. Yumashev, E. Raaben, A. A. Zhilin, and A. A. Lipovskii, *Phys. Stat. Sol. (B)* 224, No. 1, 253-256 (2001).

The aforementioned materials were developed to work only with a Er:glass laser (operating at 1.54 µm), which was until recently the only accessible laser in an eye-safe wavelength spectral regime. However, lately other light sources, operating at different wavelengths, have been developed, such as a Tm:Holmium laser functioning at 2 µm and a Cr:ZnSe laser operating at 2.5 µm. Thus, there is an essential need to develop appropriate passive Q-switches that will accommodate the extended eye-safe and other IR (Infrared) laser applications.

U.S. Pat. No. 4,738,798 to Mahler entitled "Semiconductor compositions", is directed to a composition for particles of a semiconductor material in a copolymer matrix. The copolymer matrix comprises at least one α-olefin having the formula $RCH=CH_2$, where R is selected from hydrogen and straight or branched alkyl groups having from 1 to 8 carbon atoms. The copolymer matrix further comprises at least one α,β-ethylenically unsaturated carboxylic acid having from 3 to 8 carbon atoms and 1 or 2 carboxylic acid groups. The α-olefin content of the copolymer matrix is from about 75 to about 99 weight percent, and the acid monomer content is from about 1 to about 25 weight percent. There is also disclosed a method for preparation of the particles directly in a copolymer matrix, by contacting an ionic copolymer precursor with appropriate anions.

U.S. Pat. No. 5,162,939 to Herron et al entitled "Small-particle semiconductors in rigid matrices", is directed to small-particle semiconductors immobilized in the pores of a glass matrix. A porous glass contains both a semiconductor and a polymer matrix in its pores. The semiconductor is comprised of any one of a group of materials, such as: CdS, CdSe, ZnS, ZnSe, PbS and PbSe. The polymer is prepared from a monomer which is comprised of any one of a group of materials, such as methacrylate esters and styrene. The glass is comprised of any one of a group of materials, such as: $SiO_2$, $GeO_2$ and $TiO_2$. There is also disclosed a device for producing third-order nonlinear optical effects. The device includes the porous glass containing both a semiconductor and a polymer matrix, at least one cation and at least one anion, and a source of coherent electromagnetic radiation that irradiates the porous glass.

U.S. Pat. No. 6,444,143 to Bawendi et al entitled "Water soluble fluorescent nanocrystals", is directed to water-soluble nanocrystals that emit light in the visible energy range. A water-soluble semiconductor nanocrystal includes a quantum dot having a selected bandgap energy overcoated with a layer of a material having greater bandgap energy. The quantum dot is a semiconductor nanocrystal with size-dependent optical and electrical properties. The outer layer of the overcoating layer includes a compound. The compound has at least one linking group that attaches the compound to the overcoating layer, and at least one hydrophilic group spaced apart from the linking group by a hydrophobic region, that prevents electron charge across the hydrophobic region. Possible compositions for the compound are provided. The particle size of the nanocrystal core is in the range of 12 Å and 150 Å. The nanocystal preferably has less than a 10% deviation in diameter of the core. The nanocrystal in an aqueous environment preferably exhibits photoluminescence having quantum yields of greater than 10%, where "quantum yield" refers to the ratio of photons emitted to those absorbed.

SUMMARY OF THE DISCLOSED TECHNIQUE

It is an object of the disclosed technique to provide a novel semiconductor nanocrystal for use as a saturable absorber of a passive Q-switch in a laser system.

In accordance with the disclosed technique, there is thus provided a passive Q-switch for a laser system operating in the near infrared spectral region. The Q-switch includes a saturable absorber based on IV-VI semiconductor nanocrystals embedded in a polymer matrix. Preferably, the semiconductor nanocrystals comprise lead selenide (PbSe) or lead sulfide (PbS) nanocrystals. The nanocrystals may undergo surface passivation via the capping of organic ligands to their surface. According to a preferable embodiment, the semiconductor nanocrystals also comprise core-shell nanocrystals, formed by epitaxially coating a core nanocrystal with a shell having an energy band gap wider than that of the core material. The core material may be lead selenide (PbSe). The shell material may be lead sulfide (PbS), lead selenide sulfide ($PbSe_xS_{1-x}$), or zinc selenide (ZnS) and other selected materials. The nanocrystals may be placed between two mediums, such as two glass panes with an anti-reflection coated surface. According to a further embodiment, the semiconductor nanocrystals may be used to form an optical fiber. The optical fiber may be used in a laser system or a communication system. The optical fiber may be used as a lasing element, a saturable absorber, an element for amplified spontaneous emission suppression, an element for noise suppression, an element for spectrum correction, and an element for signal attenuation.

According to the disclosed technique, there is also provided a passively Q-switched laser system operating in the near infrared spectral region. The system includes a back reflector, an output coupler, a pumping cavity, and a passive Q-switch. The Q-switch includes a saturable absorber including IV-VI semiconductor nanocrystals embedded in a polymer matrix.

According to the disclosed technique, there is also provided a method for preparation of a passive Q-switch for a passively Q-switched laser system operating in the near infrared spectral region. The method includes fabricating IV-VI semiconductor nanocrystals by colloidal synthesis, and embedding the nanocrystals in a transparent matrix. The semiconductor nanocrystals may comprise lead selenide (PbSe) or lead sulfide (PbS) nanocrystals. In accordance with one preferable embodiment, fabrication of the nanocrystals includes surface passivation using organic ligands. Further preferably, the semiconductor nanocrystals comprise core-shell nanocrystals, formed by epitaxially coating a core nanocrystal with a shell having an energy band gap wider than that of the core material. The core material may be lead selenide (PbSe). The shell material may be lead sulfide (PbS), lead selenide sulfide ($PbSe_xS_{1-x}$), zinc selenide (ZnS) and further selected materials. According to another preferable embodiment, a TOP:Se solution and a TOP:S solution are injected into the dissolution of lead(II) acetate trihydrate in a solution of phenyl ether, oleic acid and trioctylphosphine. By a kinetically controlled process, an initial formation of PbSe cores may be subsequently followed by the epitaxial deposit of PbS shells, to provide the core-shell nanocrystals. The method may further include placing the nanocrystals between two mediums, such as two glass panes with an anti-reflection coated surface.

BRIEF DESCRIPTION OF THE DRAWINGS

The disclosed technique will be understood and appreciated more fully from the following detailed description taken in conjunction with the drawings in which:

FIG. 3A is a High Resolution Transmission Electron Microscope image of PbSe nanocrystals fabricated according to the method of FIG. 2, when surface passivation is performed with oleic acid/TOP;

FIG. 3B is a High Resolution Transmission Electron Microscope image of a single PbSe nanocrystal with a diameter of 4.8 nm, fabricated according to the method of FIG. 2, when surface passivation is performed with oleic acid/TOP;

FIG. 4 is a graph depicting linear absorption spectra of the PbSe nanocrystals fabricated according to the method of FIG. 2, when surface passivation is performed with oleic acid/TOP, with average diameter varying between 2.3-7 nm;

FIG. 5A is a diagram depicting allowed and forbidden one-photon transitions in the PbSe nanocrystals fabricated according to the method of FIG. 2;

FIG. 5B is a graph depicting the linear absorption spectrum of a PbSe nanocrystal with average diameter of approximately 7.6 nm, fabricated according to the method of FIG. 2, when surface passivation is performed with oleic acid/TOP, with marked inter-band transitions;

FIG. 6 is a graph depicting both linear absorption spectra and photoluminescence spectra of (a) PbSe nanocrystals fabricated according to the method of FIG. 2, when surface passivation is performed with oleic acid/TOP, and of PbSe/PbS core-shell nanocrystals having PbSe core and (b) one, (c) two and (d) several layers of PbS shell, fabricated according to the method described in further detail with reference to FIG. 12;

DETAILED DESCRIPTION OF THE EMBODIMENTS

Figure 1:
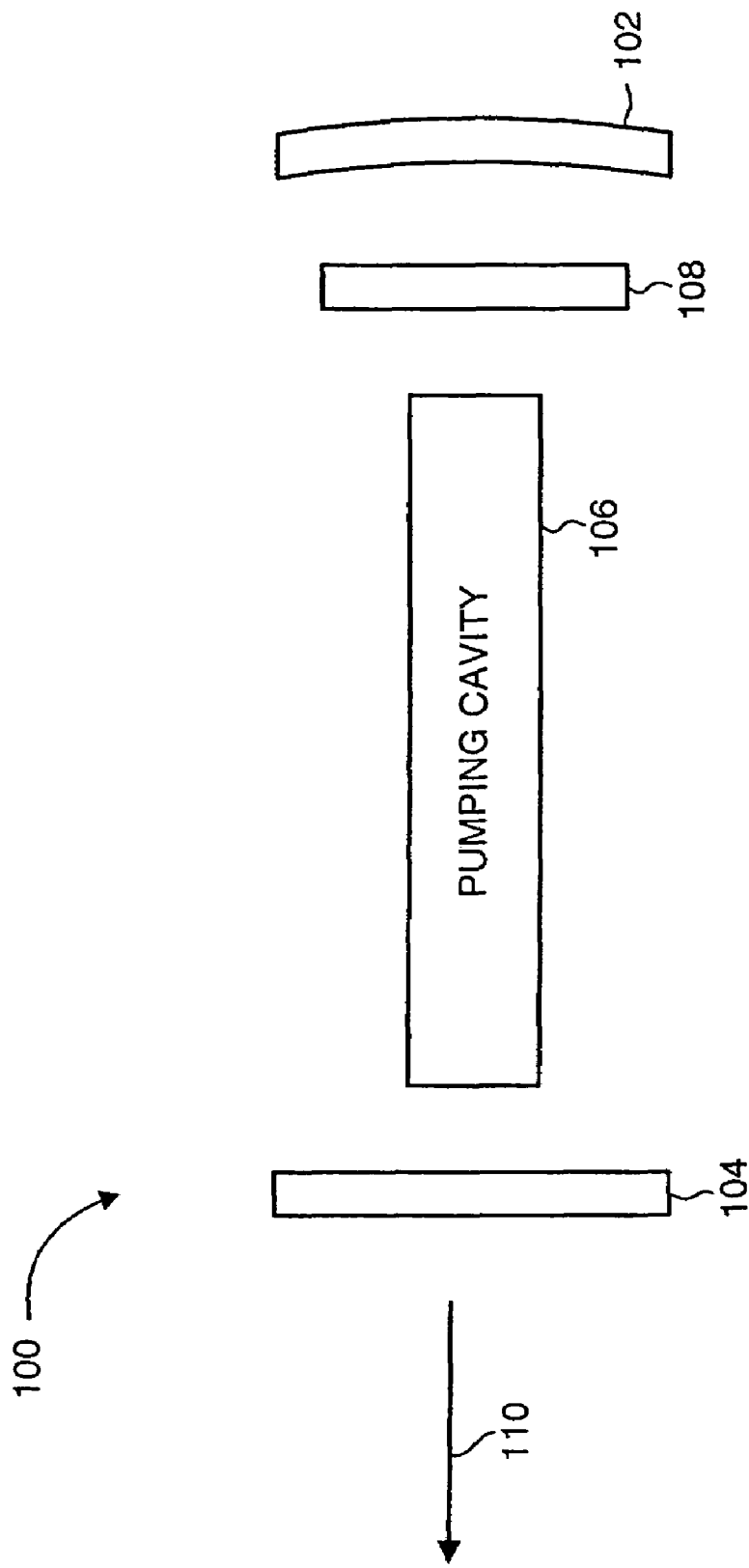
FIG. 1 is a schematic illustration of a passively Q-switched laser system, constructed and operative in accordance with an embodiment of the disclosed technique.

As mentioned above, a saturable absorber is a material whose absorption coefficient drops at high levels of incident radiation. According to current research, absorption of light by a matter corresponds to the excitation of an electron from a low energy quantum state into a higher energy state, when the light energy matches the resonance conditions, or the energy difference between the two states. Saturable absorbers should contain two isolated quantized electronic states, between which resonance absorption takes place with a large cross section (corresponding to a high quantum efficiency.), while the coupling of those states (via absorption or thermal relaxation) to neighboring electronic states is minimized. In such a situation, the higher energy level immediately reaches its full occupancy (of two electrons according to Pauli principles) under photonic flux, followed by relaxation to the lower state, either by nanoradiative or spontaneous emission processes with a typical relaxation time (τ). Hence, by applying an intermediate pumping intensity, the occupation of the lower and higher energy states can be equalized, quenching the absorption process completely. In this manner, resonance absorption causes population saturation at certain light intensities and transparency of the light at the saturated stage.

Thus, a saturable absorber should possess two discrete quantum states, with the energy difference corresponding to the laser wavelength. But a saturable absorber should also have a low excited state absorption cross-section and appropriate relaxation time. The key parameters for a saturable absorber are: wavelength range (where it absorbs); dynamic response (how fast it recovers); and saturation intensity and fluence (at what intensity or pulse energy it saturates).

As pointed out above, semiconductor crystals can function as a saturable absorber in a wide wavelength region, when the size of the crystals is in the. nanometer range. The semiconductor nanocrystals (NCs) have unique chemical and physical properties, which differ substantially from those of the corresponding bulk solids, as demonstrated by A. P. Alivisatos, *Science* 271 (1996) 933 and references therein; O. I. Micic, J. Spargue, S. Lu, and A. J. Nozik, *Appl. Phys. Left.* 68 (1996) 3150; H. Giessen, B. Fluegel, G. Mohs, N. Peyghambarian, J. R. Sprague, O. I. Micic, and A. J. Nozik, *Appl. Phys. Left.* 68 (1996) 304; A. Mews, A. V. Kadavanich, U. Banin, and A. P. Alivisatos, *Phys. Rev. B* 53 (1996); A. Hasselbarth, A. Eychmuller, R. Eichberger, M. Giersig, A. Mews, and H. Weller, *J. Phys. Chem.* 97 (1993) 5333; A. Eychmuller, A. Mews and H. Weller, *J. Phys. Chem. Letters* 208 (1993) 59; A. Eychmuller, T. Vossmeyer, A. Mews, and H. Weller, *J. Lumin.* 58 (1994) 223. NCs which are based on semiconductor materials and have a small diameter exhibit quantum confinement of both the electron and the hole in all three dimensions. This quantum confinement results in an increase of the effective band gap of the material and splits the bulk energy bands into discrete states with decreasing crystalline size. Consequently, both optical absorption and emission of NCs shift to the blue part of the spectrum (i.e., their wavelengths decrease), and their intensity is enhanced by a factor of 1,000 as the size of the crystallite decreases. Furthermore, the absorption cross-section of the ground state increases, while that of the excited state decreases due to the existence of few discrete states. Thus two different states are created, having significant differences of absorption capability, in correlation to open/closed switch states.

The disclosed technique features a passive Q-switch device, operating at the near infrared wavelength region and comprised of IV-VI semiconductor NCs. "IV-VI" designates elements from columns IV-VI in the Periodic Table of the Elements, which were found as most suitable for the 700-4, 000 nm, preferably 1,300-3,000 nm, lasing range. The device may be integrated into a flash-pumped, diode-pumped, or fiber based lasers. The disclosed technique further provides methods for the preparation of such semiconductor NCs.

Reference is now made to FIG. 1, which is a schematic illustration of a passively Q-switched laser system, generally referenced 100, constructed and operative in accordance with an embodiment of the disclosed technique. System 100 includes a back reflector 102, a flat output coupler 104, a pumping cavity 106, and a passive Q-switch 108. It is noted that Q-switch 108 is shown in FIG. 1 located between pumping cavity 106 and reflector 102. It will be appreciated that Q-switch 108 may also be located between pumping cavity 106 and coupler 104, or in any suitable constellation.

Back reflector 102 is an optical device, such as a mirror, and is typically concave, as exemplified in FIG. 1. The shape of reflector 102 may be ellipsoidal, paraboloidal, and the like. Reflector 102 reflects incident-light toward cavity 108.

Output coupler 104 is an optical device, such as a flat mirror, and is partially transmissive. Reflector 102 and coupler 104 reflect light generated by an active medium in pumping cavity 106 back and forth to build up amplification. The amplified light is eventually emitted through output coupler 104, toward the output direction, designated by arrow 110.

Reflector 102 and coupler 104 together comprise a laser resonator. The area between reflector 102 and coupler 104 is the pumping cavity 106, and in this sense FIG. 1 is an exploded view of system 100. Inside pumping cavity 106 is a laser rod containing lasable material such as doped crystal, doped glass, gas, or dye.

Q-switch 108 is a passive Q-switch based on a saturable absorber. Q-switch 108 absorbs radiation, at the laser wavelength, and has a low value of saturation intensity. Below a specific threshold, Q-switch 108 blocks incoherent light and prevents laser oscillations from building up in the resonator, increasing the laser gain. At some point, due to saturation, Q-switch 108 becomes transparent, and a laser pulse of very high peak power is generated.

The saturable absorber of the Q-switch is comprised of lead selenide (PbSe), lead sulfide (PbS), "core-shell", or "core-alloy-shell" semiconductor NCs, embedded in a polymer matrix. Alternatively, the matrix is any other suitable transparent matrix (e.g., glass, sol-gel, and the like). The polymer matrix is transparent to the relevant wavelengths. In reference to the phrase "core-shell", the saturable absorber includes a core NC which is epitaxially coated with a shell NC, where the shell material has an energy band gap wider than that of the core material. The core material may be lead selenide (PbSe). The shell material may be lead sulfide (PbS), lead selenide sulfide ($PbSe_xS_{1-x}$), or zinc sulfide (ZnS) and further materials mentioned below. The operating wavelength of the saturable absorber is determined by the size of the NCs core, for core-shell NCs, and by the size of the outer diameter, for core-alloy-shell NCs.

PbS and PbSe NCs exhibit a size-tunable absorption resonance in the wide wavelength region (i.e., near IR: 700 nm to 3,000 nm or 4,000 nm, respectively). PbSe and PbS NCs inherit unique properties of PbSe and PbS semiconductors. A bulk PbSe and PbS has a cubic (rock salt) crystal structure and a narrow direct band gap of 0.28 eV and 0.41 eV at 300° K respectively. The high dielectric constant $\epsilon$ ($\epsilon$=24.0 for PbSe and $\epsilon$=18.0 for PbS) and the small electron and hole effective mass (less than 0.1 m*, where m* designates free electron mass) create an exciton with a relatively large effective Bohr radius $a_B$ ($a_B$=46 nm and 18 nm, for PbSe and PbS, respectively). This radius is much larger than that of well known II-VI and III-V semiconductor NCs, for example—eight times larger than the effective Bohr radius of CdSe (roman characters represent columns in the Periodic Table of the Elements). The II-VI and III-V semiconductor NCs exhibit a large optical nonlinearity. However, in contrast to PbSe and PbS, the absorption edges of II-VI and III-V semiconductor NCs appear at energies that are far from the infrared (IR) application requirements. The electronic spectra of NCs of the lead salts are simple, with energy spacings that can be much larger than the energy gaps of the bulk materials. Furthermore, these materials have a relatively low value of saturation intensity of about 0.18 $MW/cm^2$. The aforementioned properties make PbS and PbSe NCs suitable for application as a saturable absorber in the IR wavelength range of 700 up to 3,000 or 4,000 nm, respectively, and in the eye-safe range of 1,500-3,000 or alternatively 1,300-1,800 nm in particular.

Due to the small size of NCs and, consequently, their relatively large surface to volume ratio, the effect of the nanocrystal surface on the charge carriers cannot be neglected. For crystals in such a small regime, a large percentage of the atoms are on or near the surface. Even in cases where bulk crystallinity has been preserved, surface imperfection such as dangling bonds, adatoms (adsorbed atomic or molecular species held by forces that do not disturb the valence electron charge distribution of the species), vacancies, and stochiometric defects may occur. Furthermore, surface and interface states may act as electron (or hole) traps. The trapped carriers can recombine directly, they can thermally repopulate the exciton states, or they can decay nonradiatively. Thus, trapping of carriers at surface sites may alter the linear and non-linear optical properties of the material. Therefore, in order to realize effective quantum confinement, the surface properties must be modified, to reduce or prevent the charge carriers from interacting with the surface.

The properties of the semiconductor NCs, resulting from the quantum confinement effect, can be manifested only in high quality NCs with a narrow size distribution. The high requirements regarding the quality of the NCs reflect the demands of the NCs preparation technique, involving control of the size, structure, and the shape of the material.

It is noted that new passive Q-switches developed in accordance with the disclosed technique enable production of compact and microchip diode-pumped solid-state lasers, as well as fiber lasers emitting in the 0.7-4 μm region, particularly in the 1.3-3 μm region.

It is further noted that passive Q-switching in the region of 1,000 up to 3,000 or 4,000 nm, attenuators or filters for the selected wavelength between 700 up to 2,500 or 4,000 nm, an emitter in the 1,000 up to 2,500 or 4,000 nm region and multi-spectral detectors, are all potential applications of devices on the base of the IV-VI semiconductor NCs in the polymer matrix.

Figure 2:
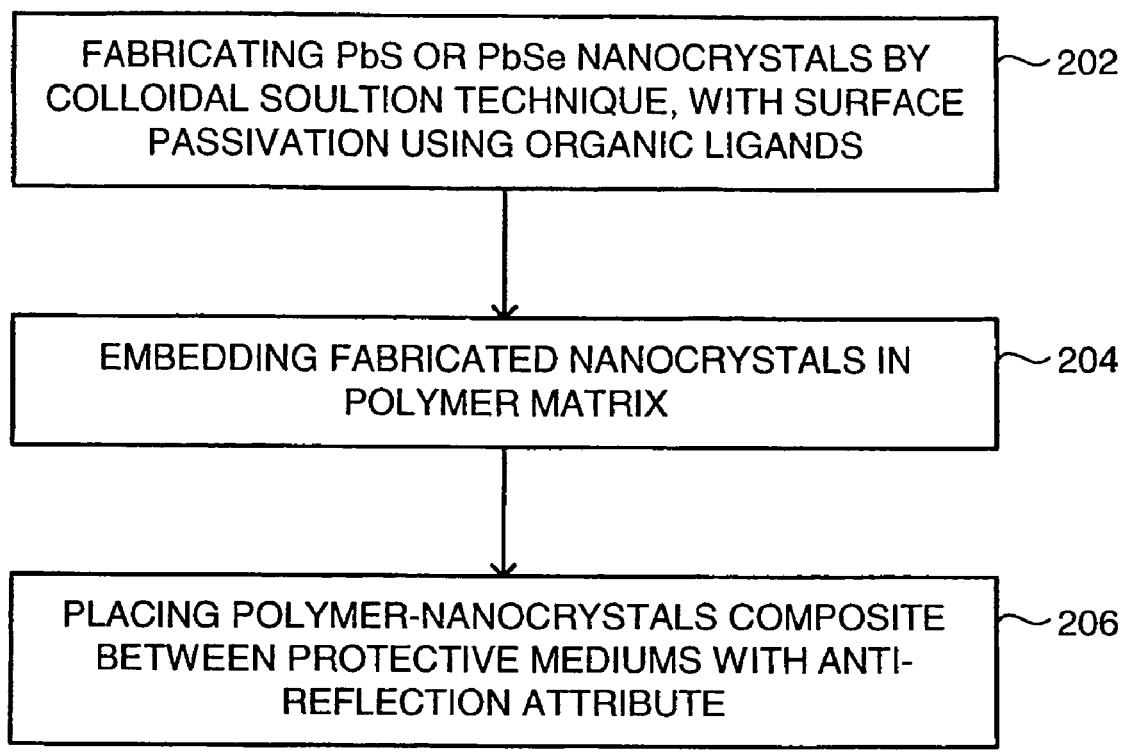
FIG. 2 is a block diagram of a method for preparation of a passive Q-switch, operative in accordance with an embodiment of the disclosed technique.

Reference is now made to FIG. 2, which is a block diagram of a method for preparation of a passive Q-switch, operative in accordance with an embodiment of the disclosed technique. In procedure 202, PbSe or PbS NCs are fabricated. Fabrication is done according to the colloidal synthesis technique described by C. B. Murray in Murray, C. B., Shouheng, S., Gaschler, W., Doyle, H., Betley, T. A., Kagan, C. R., *IBM J. Res. & Dev.* 2001, 45, 47. Fabrication procedure 202 also includes applying surface passivation to the NCs using organic ligands, pursuant to the aforementioned requirement to modify the surface properties for reducing or preventing the charge carriers from interacting with the surface. It is noted that the example described herein involved fabrication of PbSe NCs, although PbS NC may be used as well. A combination or a mixture of both PbSe and PbS can also be applied, if desired.

Colloidal solution techniques involve the injection of appropriate chemical precursors into a mother solution that contains surface capping molecules (i.e., surfactants) or growth directing molecules, and are further controlled by the temperature and duration of the reaction. The colloidal procedure described by C. B. Murray specifically enables the formation of spherical PbSe or PbS NCs with controlled size and shape, high crystallinity, narrow size distribution, and surface passivated with organic ligands. This procedure is suitable for the preparation of colloidal PbSe or PbS NCs having a diameter of 2-18 nm, and particularly 4-12 nm, with an optical activity in the IR spectral range of 300-4,000 nm, and 1,100-2,500 nm in particular.

As indicated above, surface modification is essential for suppression of charge trapping. The injection of semiconductor precursors into a reaction solution enables the capping of organic molecules to the surface, e.g., trioctylphosphine (TOP), TOP-oxide (TOPO), tributylphosphine (TPB), oleic acid, amines, and thiols. However, this passivation is not complete, leaving routes for charge trapping. These effects disrupt the performance of the NCs as saturable absorbers at a low optical intensity, making the material unsuitable for Q-switching.

The partial passivation of the surface with the organic ligands can be significantly improved by coating the NC with a layer of a wider energy gap semiconductor, as further detailed with reference to FIG. 12. An inorganic epitaxial shell a few monolayers thick (i.e., where a monolayer is a one molecule thick layer), with a relatively close crystallographic match, produces improved chemical passivation, makes the NCs more robust, and induces a potential carrier for the leaking of carriers to the surface. Thus, a wide band-gap semiconductor shell enhances quantum confinement of carriers and improves the quantum efficiency.

Good epitaxial overcoating requires the use of a wider band-gap material with compatible lattice constants and crystal structure. This refers to using a material With the same crystal structure so that epitaxial overcoating can be accomplished in all crystal directions with the same efficiency. The lead chalcogenides have a highly symmetrical rocksalt crystal structure, which is not common amongst most semiconductor materials. PbS epitaxial coating over a PbSe core will fulfill the crystal matching requirement. In this case the PbS shell has a wider energy gap (0.41 eV at 300° K.) than that of the PbSe core (0.28 eV). Although, the band edge alignment of the PbSe and PbS pair in the bulk (when Ec(PbSe)<Ec(PbS)<Ev(PbSe)<Ev(PbS); where "Ec" designates the energy at the edge of the conduction band, and "Ev" designates the energy at the edge of the valence band, predicts a type II (i.e., indirect) transition or separation of the photo-generated carriers between the core and the shell. However, the band edge alignment in the NCs will not necessarily obey the bulk ordering, depending on the core diameter and the shell thickness. Furthermore, the formation of $PbSe_xS_{1-x}$ shell (instead of simple PbS) should improve the crystallographic matching as well as the tuning of the core-shell band offsets. With reference to FIG. 6, preliminary data predicts enhanced quantum efficiency (an increase from 40% to 65%) upon the formation of the core-shell structures.

Referring again to FIG. 2, the PbSe colloidal NCs samples were synthesized according to the modified version of the Murray synthesis technique, and surface passivation was performed with oleic acid/TOP. The synthesized NCs have an extremely narrow size distribution of less than 5% and an average diameter of 4-8 nm.

A JEOL brand 3010 EX model High Resolution Transmission Electron Microscope (HRTEM) operating at 300 kV and a LEO Zeiss brand 982 model High Resolution Scanning Electron Microscope (HRSEM) operating at 4 kV, were used to determine the size, shape, and crystallinity of the NCs. An Analytical TEM (2000FX, JEOL) equipped with X-ray Energy Dispersive Spectroscopy (EDS) and operated at 200 kV was used for micro-composition analysis. The mean diameter and standard deviation were determined by averaging more than a hundred NCs.

In procedure 204, the finished NCs are embedded in a polymer matrix, forming a stable and durable composite, as further detailed with respect to FIG. 8 below. Alternatively, the matrix is any other suitable transparent matrix (e.g., glass, sol-gel, and the like). Finally, if required, the polymer composite is placed between two transparent protective mediums, in an optional procedure 206. The mediums may include layers, coatings, boards or panels such as glass panes, with anti-reflection coating for protection and elimination of wave-distortion of the Q-switch assembly, as further explained with respect to FIG. 8 below.

Reference is made to FIGS. 3A and 3B. FIG. 3A is a HRTEM image taken of PbSe nanocrystals fabricated according to the method of FIG. 2, when surface passivation is performed with oleic acid/TOP. FIG. 3B is a HRTEM image taken of a single PbSe nanocrystal with a diameter of 4.8 nm, fabricated according to the method of FIG. 2, when surface passivation is performed with oleic acid/TOP. With reference to FIG. 3A, there is presented a few NCs with nearly uniform size. With reference to FIG. 3B, there is presented a zoom into a specific NC, showing well-defined crystallographic fringes (crystallographic plane [100]) of a rock salt cubic phase. The structural properties as well as optical absorption and photoluminescence of the synthesized PbSe NCs were investigated, to obtain information about spectroscopic characteristics of the material.

Reference is now made to FIG. 4, which is a graph depicting linear absorption spectra (RT) of the PbSe nanocrystals fabricated according to the method of FIG. 2, when surface passivation is performed with oleic acid/TOP, with average diameter varying between 2.3-7 nm. The absorption spectra were recorded in room temperature using a Shimadzu Ultraviolet-Visible (UV/VIS) spectrometer and a JASCO V-570 UltravioletVisible/Near-lnfrared (UV/VIS/NIR) spectrophotometer. The synthesized NCs have a well-defined absorption bands in the 1,000-1,850 nm region blue shifted from the absorption edge at 4,700 nm of the bulk material.

Reference is now made to FIGS. 5A and 5B. FIG. 5A is a diagram depicting allowed and forbidden one-photon transitions in the PbSe nanocrystals fabricated. according to the method of FIG. 2. FIG. 5B is a graph depicting the linear absorption spectrum of a PbSe nanocrystal with average diameter of approximately 7.6 nm, fabricated according to the method of FIG. 2, when surface passivation is performed with oleic acid/TOP, with marked inter-band-transitions.

With reference to FIG. 5B, the marked transitions are practically monochromatic, substantially separated from one another (at about 180 meV), and tunable according to the size of the NCs, with strong oscillator strength at room temperature. These properties make the PbSe NCs useful for passive Q-switching in laser applications. In this context, the NCs are in accordance with the investigations of Wise et al. and Lipovskii et al. (Andreev, A. D., Lipovski, A. A. *Phys. Rev. B*, 1999, 59, 15402), which showed that the direct band transitions are at the L point of the Brillouin zone, with a four-fold degeneracy at the valence band in cubic PbSe NCs.

Ignoring the degeneracy, the allowed transitions should obey the following selection rules: $\Delta j=0,\pm 1$ and $\pi_e \pi_h=-1$, where j and $\pi$ designate the total angular momentum and parity of the electronic state. According to these rules, the transitions labeled (1) and (2) in FIG. 5B correspond to the $j=1/2, \pi=1 \rightarrow j=1/2, \pi=-1$ and $j=1/2$ or $3/2, \pi=-1 \rightarrow j=1/2$ or $3/2, \pi=1$ transition, respectively. The transitions pointed to by the dashed arrow in FIG. 5A represent the parity-forbidden transition $j=1/2, \pi=1 \rightarrow j=1/2, 3/2, \pi=1$ or $j=1/2, 3/2, \pi=-1 \rightarrow j=1/2, \pi=-1$, which becomes partially allowed due to a mixing of the degenerate states in the valence band.

The anticipated transition energies, according to the discussed theories, are in close agreement with the experimental results shown in FIGS. 4, 5A and 5B.

The PL spectra of PbSe NCs were recorded at room temperature and at cryogenic temperatures (80K and 1.4K). The PL bands were typically Stokes shifted from the first absorption band by 2-20 meV (depending on the size of the NCs), with full width half maximum (FWHM) of about 50-60 meV.

Reference is now made to FIG. 6, which is a graph depicting both linear absorption spectra and photoluminescence spectra of (a) PbSe nanocrystals fabricated according to the method of FIG. 2 when surface passivation is performed with oleic acid/TOP, and of PbSe/PbS core-shell nanocrystals fabricated having PbSe core and (b) one, (c) two and (d) layers of PbS shell, according to the method described in further detail with reference to FIG. 12. The photoluminescence (PL) spectra are designated by solid curves. The absorption curves, similar to those shown in FIG. 4, are designated by dashed curves. The PbSe core NCs and the PbSe/PbS core-shell nanocrystals each have core diameter of 4.7 nm. The shell thickness of the PbSe/PbS core-shell NCs varies between 1-3 PbS monolayers, respectively (where the thickness of each monolayer is 1.2 nm). The PL spectra shown in FIG. 6 were recorded at 80° K, with non-resonant He—Ne laser excitation.

Figure 7:
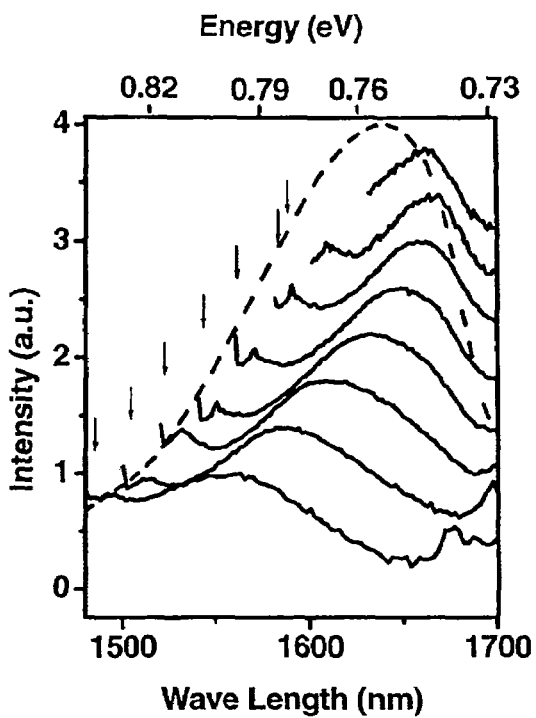
FIG. 7 is a graph depicting photoluminescence spectra of PbSe nanocrystals with average diameter of 6.6 nm, fabricated according to the method of FIG. 2, when surface passivation is performed with oleic acid/TOP, excited resonantly and excited non-resonantly.

Reference is now made to FIG. 7, which is a graph depicting photoluminescence spectra of PbSe nanocrystals with average diameter of 6.6 nm, fabricated according to the method of FIG. 2, when surface passivation is performed with oleic acid/TOP, excited resonantly and excited non-resonantly. The PL spectra for the PbSe NCs excited resonantly are shown by the solid lines in FIG. 7, whereas the corresponding non-resonant PL curve is shown by a dashed line. The PL spectra were excited with an energy level indicated by the arrows. The resonant PL bands are Stokes shifted from the laser excitation energy by 40 meV, with a band FWHM between 15-45 meV. Thus, the resonant excitation produces a narrower PL band, corresponding to a subgroup with a selective NCs diameter. The broadening of the corresponding non-resonant PL band is due to the size distribution of the NCs, blurring accurate information regarding the properties of individual NCs. Thus, the size-selective excitation, leading to a fluorescence line narrowing, is a preferred methodology for the investigation of the PL properties of the materials. The narrow and relatively intense PL of selectively sized NCs, once again, is associated with the discreteness of the electronic states.

To make the colloidal NCs ready for application, the NCs must be separated from the colloidal solution and embedded in a suitable matrix, which will support the NCs, protect the NCs mechanically, prevent agglomeration of the NCs, and save their unique properties. In addition, the NC-matrix should fulfill laser system requirements, such as durability with regard to the laser radiation and high transmission at the laser wavelength, in the event that the NC-matrix is inserted in the laser system. The colloidal PbSe NCs, as well as PbS NCs and core-shell NCs, can be embedded in the transparent polymer matrix to form a thin film. The matrixes from polymethyl-methacrylate ([—$H_2C(CH_3)(CO_2CH_3)$-]n (PMMA), or Poly(vinyl butyral-co vinyl alcohol)n-co-vinyl-acetate (PVB) preserve the properties of the colloidal NCs: narrow size distribution, structurated absorption, well-defined NCs size in the desired region and the properties of the NCs as the low energy saturable absorber. The NCs embedded in polymer composite can be formed in a variety of shapes, which may be suited to a particular application (e.g., disk, rod, plate, block, fiber, film, and the like). Film is a preferred shape.

After preparation of the NCs in the colloidal solution and selection of the NCs according to size, the NCs were embedded in the PMMA polymer matrix, in accordance with procedure 204. The polymer was prepared by mixing PbSe NCs in chloroform solution with PMMA solution. The resultant mixture was spread on a suitable substrate and dried until a uniform polymer film filled with the NCs was formed.

The concentration of the NCs in the polymer was chosen to provide the preferred film transmission of 80-90% at the desired wavelengths. It will be appreciated that the polymer matrix per se is substantially transparent at the desired operational wavelengths.

The polymer film including NCs can be used as an optical Q-switch. However, requirements for materials in a laser system include a high peak power durability and manufacturability. The special devices were prepared with the purposes of increasing the Q-switch durability, protecting the film, and preventing a wave front distortion. As mentioned above, in optional procedure 206, the Q-switch was prepared by placing the polymer film embedded with NCs between two glass panes with anti-reflection coated surfaces. The glass panes can be replaced by any other suitable protective and non-reflective medium, layer, or coating. The anchoring of the NCs polymer film between two glass panes was performed using a suitable UV cured optical adhesive and with the help of an autocollimator to provide a parallelism of the surfaces better than 20 arc seconds. The Q-switch has good mechanical properties, can be sealed from the atmospheric moisture and is thermally stable to the decomposition point of the polymer.

In accordance with the method of FIG. 2, fabrication Was performed using different materials and the results were examined. PbSe NCs were fabricated according to a modified version of the Murray synthesis technique. The resulting colloidal PbSe assemblies were able to withstand working environment conditions. The individual PbSe NCs, which eventually are capped with TBP/TOPO ligands (as opposed to oleic acid as previously), were prepared by a chemical reaction between lead-cyclohexanebutirate (Pb-cHxBu) and selenium precursors (STREM or Aldrich with technical grade), for surface passivation. A stock solution was prepared by dissolving the precursors in TBP solution at room temperature, under standard inert conditions in a glove box, using the following Se:Pb-cHxBu:TBP mass ratios: (a) 0.25:0.6:50; (b) 0.5:1.2:50; (c) 1:2.5:50.

A mother solution of TOPO surfactant (6.0 gr, Aldrich 90% or 99% purity) was placed in a three-neck flask, under inert conditions (with Argon flow) at 150° C. Then the stock solution was injected rapidly into the mother solution, followed by an immediate temperature decrease to 118° C. The reaction proceeded in two different fashions: (a) retaining the reaction at the last temperature and terminating the reaction after 15 minutes by rapid cooling to 70° C.; (b) gradual heating of the solution to 150° C. and extending the reaction time duration at this temperature to 150 minutes. Aliquots from the reaction were removed every few minutes by a syringe and were injected into a 1 ml methanol solution, which quenched any further growth of the NCs.

The reaction between the precursors indicated that starting with a stock solution of Se:Pb-cHxBu:TBP with a low mass ratio of 0.25:0.6:50, at a constant temperature of 118° C., led to the formation of mono-dispersed spherical NCs with average diameters of 3.5-5.0 nm (size distribution about 10%), depending on the reaction time duration. The individual PbSe NCs were capped with TOPO/TBP surfactant. It is noted that in this case, the NC surface is passivated with organic ligands.

Increasing the precursor concentration and raising the temperature of the reaction (from 118° C. to 150° C.) after the injection of the precursors, accompanied by an extension of the reaction duration, enabled formation of NCs assemblies with various morphologies. Reaction time duration between 10-60 minutes led to the formation of spherical PbSe assemblies, with a surprisingly uniform diameter between 450-500 nm.

Using concentration of precursors of Se:Pb-cHxBu:TBP with a mass ratio of 0.5:1.2:50 (at 150° C.), with a reaction time duration of 90 minutes, led to the formation of PbSe assemblies in the form of straight and junction-like wires.

The products of the-reaction were separated from the solution by centrifugation. Further purification and mono-dispersity of the product was achieved by a few re-dissolving centrifuging cycles in methanol-butanol solution. The finished NC agglomerates were then embedded in a polymer PVB film, with reference to procedure 204. It is noted that with reference to the previous model, where the starting materials included oleic acid and the end of the reaction was dissolved in chloroform, a PMMA film was used since PMMA dissolves well in chloroform. In contrast, here TBP/TOPO was used and the resulting NCs dissolve nicely in Toluene. Since PVB dissolves better in Toluene, it is preferable to mix the NCs with a PVB polymer.

The PVB film incorporating NCs was prepared with the following procedure. 1 g of PVB polymer was dissolved in 10 mL of toluene. Then, 2 mg of the PbSe NCs of the desired size were mixed with 3 mL of PVB-toluene solution. The resulted mixture was spread on a 50 mm diameter Petri dish and dried overnight, until an optically transparent thin uniform polymer film, embedded with the NCs, is formed.

With reference to procedure 206, a polymer film is placed between two protective mediums with an anti-reflection attribute (e.g., two glass windows with anti-reflection coated surfaces). The protective mediums provide protection to the film and prevent wave-front distortion of the Q-switch assembly.

Figures 9A, 9B, 9C:
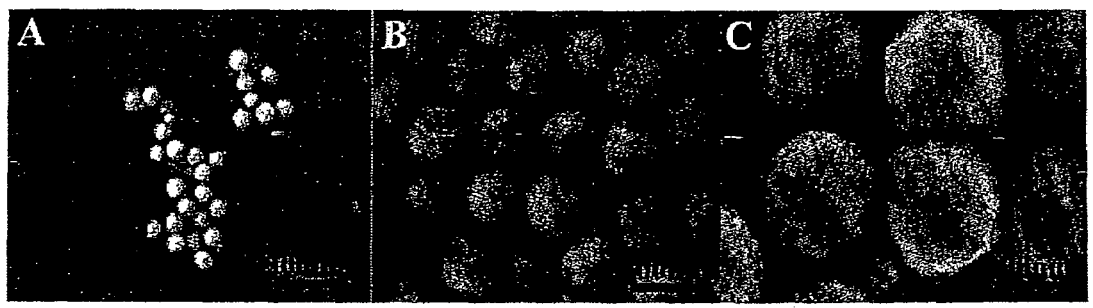
FIG. 9A is a High Resolution Scanning Electron Microscope image of spherical PbSe assemblies fabricated according to the method of FIG. 2, when surface passivation is performed with TBP/TOPO ligands, observed after 10 minutes.
FIG. 9B is a High Resolution Scanning Electron Microscope image of spherical PbSe assemblies fabricated according to the method of FIG. 2, when surface passivation is performed with TBP/TOPO ligands, observed after 25 minutes.
FIG. 9C is a High Resolution Scanning Electron Microscope image of spherical PbSe assemblies fabricated according to the method of FIG. 2, when surface passivation is performed with TBP/TOPO ligands, observed after 40 minutes.
Figure 10:
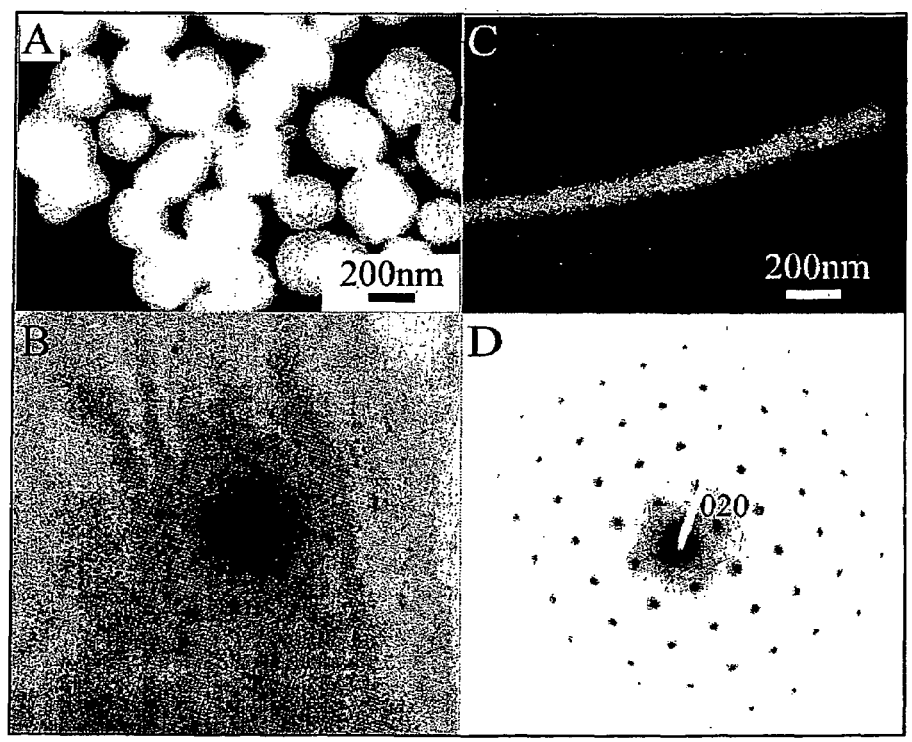
FIG. 10A is a Transmission Electron Microscope image of spherical PbSe assemblies fabricated according to the method of FIG. 2, when surface passivation is performed with TBP/TOPO ligands.
FIG. 10B is a Selected Area Electron Diffraction pattern of the spherical PbSe assemblies shown in FIG. 11A.
FIG. 10C is a Transmission Electron Microscope image of a wire-like PbSe assembly fabricated according to the method of FIG. 2, when surface passivation is performed with TBP/TOPO ligands.
FIG. 10D is a Selected Area Electron Diffraction pattern of the wire-like PbSe assembly shown in FIG. 11C.

Reference is how made to FIGS. 9A, 9B and 9C. FIG. 9A is a HRSEM image of spherical PbSe assemblies fabricated according to the method of FIG. 2, when surface passivation is performed with TBP/TOPO ligands, observed after 10 minutes. FIG. 9B is a HRSEM image of spherical PbSe assemblies fabricated according to the method of FIG. 2, when surface passivation is performed with TBP/TOPO ligands, observed after 25 minutes. FIG. 9C is a HRSEM image of spherical PbSe assemblies fabricated according to the method of FIG. 2, when surface passivation is performed with TBP/TOPO ligands, observed after 40 minutes. Reference is now made to FIGS. 10A, 10B, 10C and 10D. FIG. 10A is a Transmission Electron Microscope (TEM) image of spherical PbSe assemblies, fabricated according to the method of FIG. 2, when surface passivation is performed with TBP/TOPO ligands. FIG. 10B is a Selected Area Electron Diffraction (SAED) pattern of the spherical PbSe assemblies shown in FIG. 10A. FIG. 10C is a TEM image of a wire-like PbSe assembly, fabricated according to the method of FIG. 2, when surface passivation is performed with TBP/TOPO ligands. FIG. 10D is a SAED pattern of the wire-like PbSe assembly shown in FIG. 10C. The SAED patterns of FIGS. 10B and 10D reveal that the spherical PbSe assembly has a glassy morphology, while the wire-like PbSe assembly has an ordered structure, with a diffraction pattern in the [100] zone axis, revealing a rock salt cubic structure with a lattice constant of 6.1 Å. The change in the optical properties resulting from the growth of the PbSe assemblies was examined by recording the absorption spectra of intermediate aliquots during the reaction.

Figure 11:
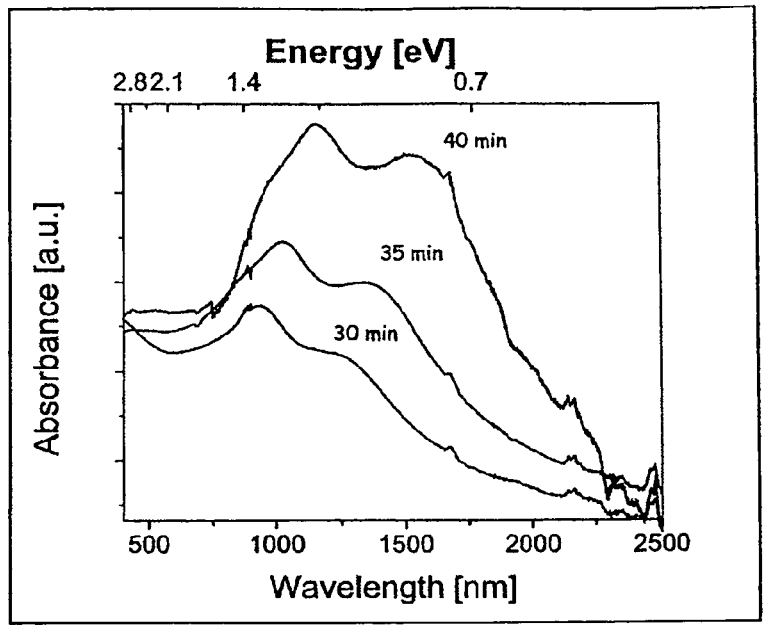
FIG. 11 is a graph depicting linear absorption spectra of PBSe nanocrystals fabricated according to the method of FIG. 2, when surface passivation is performed with TBP/TOPO ligands, with reaction time duration varying between 30-40 minutes.

Reference is now made to FIG. 11, which is a graph depicting linear absorption spectra of PbSe nanocrystals fabricated according to the method of FIG. 2, when surface passivation is performed with TBP/TOPO ligands, with reaction time duration varying between 30-40 minutes. The spherical NCs assemblies were prepared with a mass ratio of the precursors Se:Pb-cHxBu:TBP of 0.5:1.2:50.

Each absorbance curve exhibits two pronounced exciton bands between 1,000-1,600 nm (0.775-1.240 eV), blue shifted with respect to the bulk energies. Organization of the individual PbSe NCs into ordered or disordered assemblies is governed by the NCs uniformity in size and shape, surface coating and inter-NCs distance, growth temperature and NCs concentration. The inter-NCs interactions play a major role in the assembly stability, which is controlled predominately by the inter-NCs distance. The inter-NCs distance can vary from intimate contact to about 5 nm (depending on the length of the organic capping). The inter-NCs distance with TOPO/TBP coating is about 1.1 nm, although inter-digitative bundling of the surface ligands or dilute coating can reduce the inter-NCs distance to 0.6 nm. Previous works (such as Kotov et al. and Heath et al. mentioned above) suggested that an inter-NCs distance of less than 0.5 nm permits an exchange interaction between proximal NCs, allowing a wave function overlap and electronic delocalization, approaching those of the corresponding bulk materials. In contrast, at inter-NCs distance greater than 0.5 nm, the interactions are dominated by dipolar coupling. The retention of clear size-dependent excitonic features in the absorption spectra in FIG. 11 is evidence that the NCs are still distinct. Thus, it is more likely that the inter-NCs interactions in PbSe assemblies are controlled by permanent dipole-dipole interactions. The organization of PbSe NCs in close proximity is expected to induce mutual polarization, creating a permanent electric dipole. This dipole can be characterized as a surface localized charge given by the expression:

$$\mu = 6e\vec{r}\frac{\varepsilon_{2\infty}}{(\varepsilon_{2\infty} + 2\varepsilon_{1\infty})},$$

where
$\varepsilon_{2\infty}$ is the dielectric constant of a PbSe NC ($\varepsilon_{2\infty}=24.0$);
$\varepsilon_{1\infty}$ is the dielectric constant of the external medium ($\varepsilon_{1\infty(TOPO)}=2.1$); and
$\vec{r}$ is the diameter of the individual NC.

Thus, μ=500 Debye (permanent dipole units) is estimated by the indicated relation for a PbSe NCs with 10 nm diameter. Furthermore, a dipole-dipole interaction energy between adjacent NCs can be calculated with the classical formula:

$$E = \frac{-\mu}{2\pi\varepsilon_0\vec{r}(\vec{r}^2 - D^2)},$$

where
D is the NCs surface-to-surface distance; and
$\varepsilon_0 = 8.9*10^{-12}$ $C^2J^{-1}$ $m^{-1}$ is the vacuum dielectric permittivity.

Evaluation of the dipole-dipole energy for 10 nm NC yields −28 kJ/mole.

Figure 12:
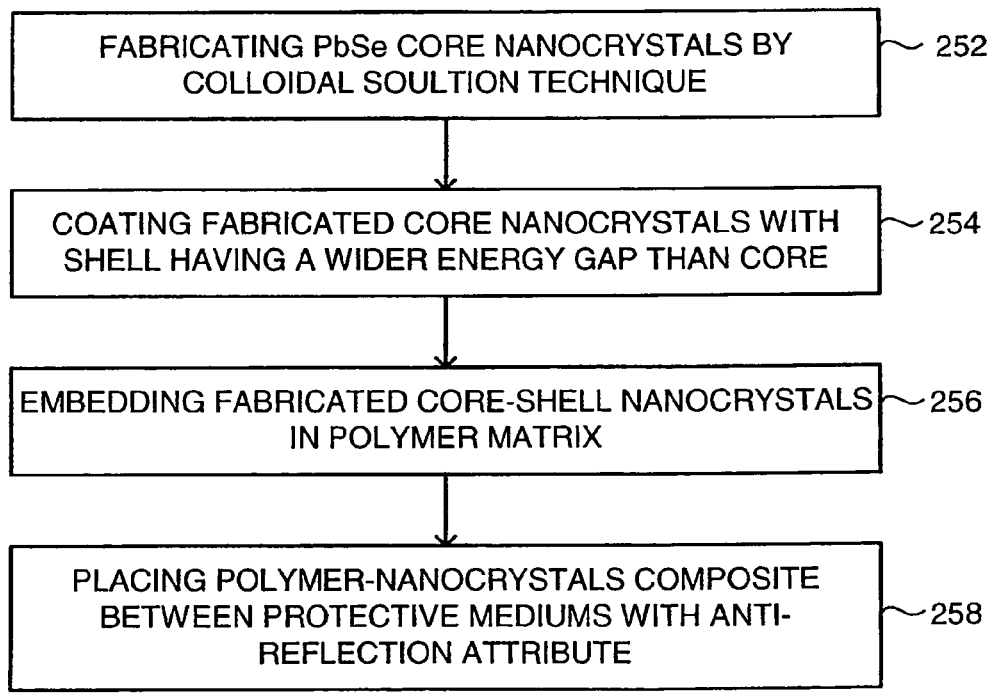
FIG. 12 is a block diagram of a method for preparation of a passive Q-switch, operative in accordance with another embodiment of the disclosed technique.

Reference is now made to FIG. 12, which is a block diagram of a method for preparation of a passive Q-switch, operative in accordance with another embodiment of the disclosed technique.

In procedure 252, PbSe core NCs are fabricated via the colloidal solution technique. Fabrication procedure 252 includes adding oleic acid/TOP to the NCs, similar to the organic passivation of procedure 202, with reference to FIG. 2. These organic ligands are generated to enhance the synthesis of the core NCs. The organic ligands serve mainly to maintain the core size and prevent agglomeration. As a collateral byproduct, the organic ligands also partially passivate the surface of the NCs. However, since this partial passivation still leaves routes for charge trapping, which negatively impacts the performance of the material as a saturable absorber at low optical intensity (as mentioned earlier), surface passivation of the PbSe NCs is improved by further passivation. This further passivation takes the form of coating the core with a shell.

In procedure 254, the PbSe core NCs are coated with a shell. The shell has an energy gap wider than that of the core material. The relative alignment of the band edge energies may be selected. For instance, a core PbSe has an energy gap of 0.28 eV whereas a shell PbS has an energy gap of 0.41 eV. The band edge alignment is adjusted by the core diameter and shell thickness. Coating the core with a wide bandgap semiconductor enhances quantum confinement of the core NCs and intensifies the quantum size effect. It is noted that the preferable material for the shell is PbS, though other materials may be used as well, such as those of the group II-VI (, ZnSe, ZnTe, CdS, CdSe, CdTe, HgS, HgSe, HgTe, MgTe, and the like) and III-V (GaN, GaP, GaAs, GaSb, InN, InP, InAs, InSb, and the like).

Colloidal synthesis of the PbSe/PbS core-shell NCs, includes the following steps:

(1) Flask 1: 0.63 g of lead(II) acetate trihydrate (Pb[$CH_3COO$]$_2$.3$H_2O$) (GR, Merck) was dissolved in a solution of 2 mL phenyl ether ($C_6H_5OC_6H_5$) (99+%, Aldrich), 1.5 mL oleic acid ($CH_3(CH_2)_7CHCH(CH_2)_7COOH$) (99.8%, Aldrich) and 8 mL trioctylphosphine (($C_8H_{17})_3P$) (Tech, Aldrich) under standard conditions of a glove box;

(2) Flask 2: 10 mL of phenyl ether was inserted into the flask in the glove box;

(3) Flask 1 and flask 2 were taken out of the glove box, placed on a Schlenk line and heated under vacuum for an hour at 85° C.;

(4) Flask 1 was then cooled to 45° C. under an inert atmosphere of argon, while Flask 2, also under argon, was heated to a temperature between 180-210° C.;

(5) 0.162 g of selenium was dissolved in 1.8 mL trioctylphosphine, forming a 1M TOP:Se solution, and 0.12 g of sulfur was dissolved in 2.0 mL trioctylphosphine, forming a 1M TOP:S solution, both under standard inert conditions of a glove box;

(6) The 1.33 mL of the TOP:Se solution and 0.37 mL of the TOP:S solution were injected into Flask 1, on the Schlenk line;

(7) The contents of Flask 1 were then rapidly injected into Flask 2.

After injection, Flask 2 was cooled to between 110 and 130° C., at which temperature the NCs were allowed to grow for 1-5 minutes. The injection and growth temperatures were varied within the ranges given above to control the spectral position of the first exciton peak. After being cooled to room temperature the NCs were precipitated out of solution with methanol, separated by centrifuge and stored in chloroform. This procedure gives relatively mono-dispersed NCs and so size-selective precipitation was not needed. Co-injection of the TOP:Se and TOP:S led initially to the formation of PbSe core (procedure 252), followed by an expitaxial cover of PbS or PbSe$_x$S$_{1-x}$ shell (procedure 254). The core-shell formation is kinetically controlled due to the substantial difference between the solubility $K_{sp}$ of the semiconductors. $K_{sp}$(PbSe)=$3 \times 10^{-28}$, while $K_{sp}$(PbS)<<$K_{sp}$(PbSe). The synthesized core-shell NCs have an average diameter of 4-8 nm.

It is noted that specific amounts, conditions, and terms are examples of obvious equivalents in all the methods described above. For example, the term "flask" may refer to any suitable container, vessel, receptacle, and the like.

Procedures 256 and 258 correspond to procedures 204 and 206 of the method of FIG. 2, and their performance is analogous. In procedure 256, the fabricated core-shell NCs are embedded in a polymer matrix. This procedure is analogous to procedure 204, with reference to FIG. 2. In procedure 258, the polymer-nanocrystal composite is placed between two protective mediums with an anti-reflection attribute. This procedure is analogous to procedure 206, with reference to FIG. 2.

Figure 13:
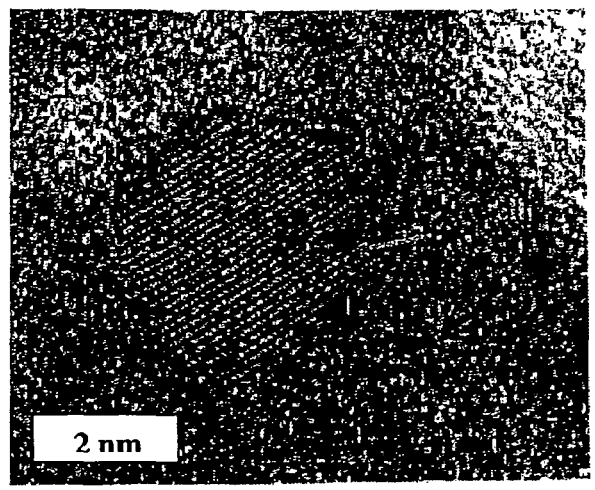
FIG. 13 is a High Resolution Transmission Electron Microscope image of PbSe—PbS core-shell nanocrystals, fabricated according to the method of FIG. 12.

Reference is now made to FIG. 13, which is a High Resolution Transmission Electron Microscope image of PbSe—PbS core-shell nanocrystals, fabricated according to the method of FIG. 12. The crystal part of the PbSe, together with the epitaxial layer of PbS (shown by the arrow), are evident in the center of FIG. 13.

Figure 14:
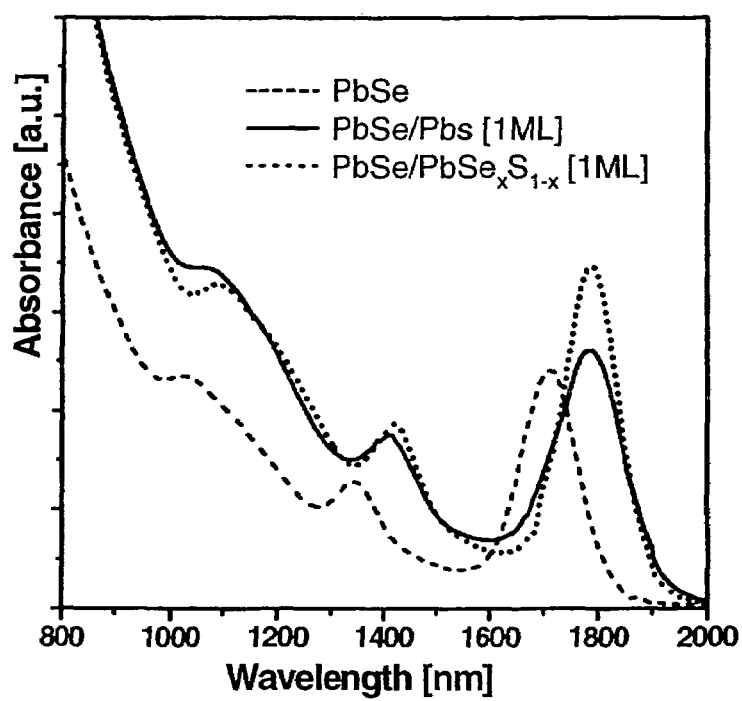
FIG. 14 is a graph depicting linear absorption spectra of (1) PbSe core nanocrystals with average diameter of 6.5 nm, fabricated according to the method of FIG. 2; (2) PbSe/PbS core-shell nanocrystals with 6.5 nm diameter core and 1 monolayer shell, fabricated according to the method of FIG. 12; and (3) $PbSe_xS_{1-x}$ core-alloy-shell nanocrystals with the equivalent of a 6.5 nm diameter core and 1 monolayer shell, fabricated according to the method of FIG. 12.

Reference is now made to FIG. 14, which is a graph depicting linear absorption spectra recorded at room temperature of: (1) PbSe core nanocrystals with average diameter of 6.5 nm, fabricated according to the method of FIG. 2; (2) PbSe/PbS core-shell nanocrystals with 6.5 nm diameter core and 1 monolayer shell, fabricated according to the method of FIG. 12; and (3) PbSe$_x$S$_{1-x}$ core-shell nanocrystals with the equivalent of a 6.5 nm diameter core and 1 monolayer shell, fabricated according to the method of FIG. 12. The absorption spectrum of PbSe core NCs is designated by a dashed curve in the graph of FIG. 14. The absorption spectrum of PbSe/PbS core-shell NCs is designated by a solid curve in the graph of FIG. 14. The absorption spectrum of PbSe$_x$S$_{1-x}$ core-shell NCs is designated by a dotted curve in the graph of FIG. 14.

The PbSe/PbS-core-shell NCs was prepared using a two-stage injection process. The PbSe$_x$S$_{1-x}$ core-shell NCs was prepared using a one-stage injection process. The exterior surface of both core-shell samples were capped with OA and TOP surfactants.

The core-shell samples in the graph of FIG. 14 have an identical Pb:Se:S stoichiometric, similar NC diameter, and identical concentration in the measured solutions. It is noted that the absorption spectrum of the alloyed core-shell (i.e., PbSe$_x$S$_{1-x}$) NCs exhibits an approximately 40% increase of quantum efficiency, and an approximately 20% decrease of exciton FWHM, with respect to both the core (i.e., PbSe) NC and the simple core-shell (i.e., PbSe/PbS) NC samples.

The graph suggests a slight red-shift of the absorption band-edge in the core-shell structures from that of the reference core structure. The red-shift increase is proportional to the increase of the shell thickness (not shown). A greater red-shift is observed for the samples prepared using a single-stage injection process. The red-shift may be explained by an anomalous sequence of the valence and conduction edge energies, when Ec(PbS)>Ec(PbSe)>Ev(PbS)≧Ev(PbSe), as reported in bulk IV-VI compounds. Thus, a spread of the wave function over Ev(PbSe) and Ev(PbS) states may occur, eventually leading to so-called type-II transitions, red-shifted with respect to type-I transitions in core NCs, in agreement with the experimental observations.

The saturation behaviour of the core-shall PbSe/PbS NCs in colloidal solution was measured using the 1.57 μm line output of a KTP (Potassium Titanyl Phosphate KTiOPO$_4$) optical parametric oscillator pumped by a 1,064 nm Nd:YAG laser with a pulse duration of 12 nanoseconds. The output beam was focused with 7 and 15 cm focal length lenses. The energy fluence through the sample was varied by changing the sample position along the output beam path.

Figure 15:
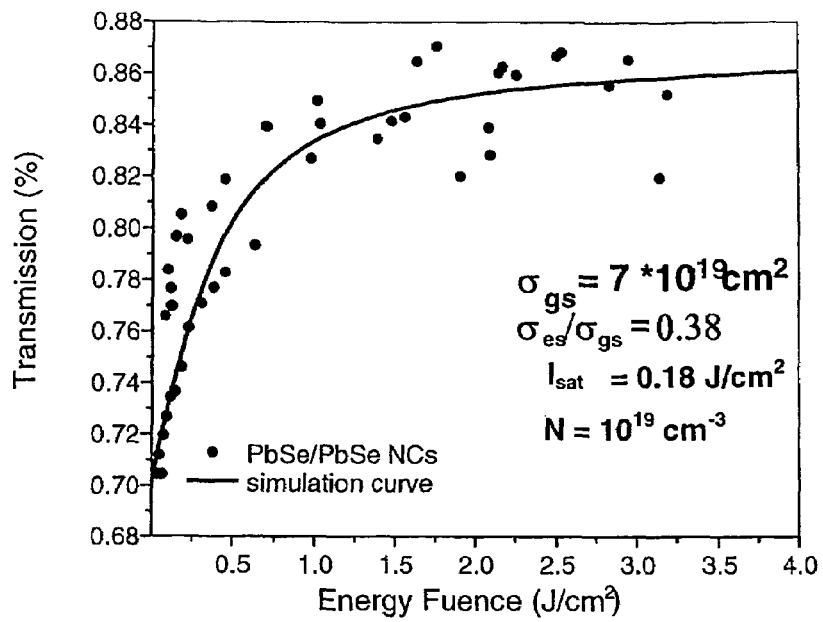
FIG. 15 is a graph depicting the transmission of PbSe/PbS core-shell NCs as a function of energy density.

Reference is now made to FIG. 15, which is a graph depicting the transmission of PbSe/PbS core-shell NCs as a function of energy density. The graph of FIG. 15 illustrates the saturation behaviour of the PbSe/PbS core-shell NCs, with average diameter of 5 nm, in colloidal solution. The dots in the graph of FIG. 15 represent experimental data, and the straight line represents the best-fit-simulation curve.

The saturation measurement data was analyzed using a "slow saturable absorber model" developed by Burstein et al (Burshtein, Z.; Blau, P.; Kalisky, Y.; Shimony, Y.; Kikta, M. R., "Excited-state absorption studies of $Cr^{4+}$ ions in several garnet host crystals", *IEEE Journal of Quantum Electronics*, No. 34 (1998), pp. 292-299). The best fit curve for the experimental data was obtained with the following parameters: ground state absorption cross section $\sigma_{GSA}$ of $7\times10^{-19}$ $cm^2$; and excited state absorption cross section $\sigma_{ESA}/\sigma_{GSA}$ of 0.38. The resultant saturation fluence is 0.18 $J/cm^2$.

A laser system, such as system 100, was built and operated to demonstrate the performance of Q-switch samples prepared in accordance with the disclosed techniques. This system consisted of a concave back reflector and flat output coupler, having reflectivity of about 85% at 1,540 nm. The laser rod was 3×40 mm Er:glass. The laser resonator cavity was about 7 cm long. The laser system was pumped with a flash-lamp. No separate focusing elements were inserted inside the cavity.

It is noted that the representative batches of the NCs was chosen for the performance tests. The passive Q-switches performance was examined intracavity. Thus far, Q-switched laser output energy, Q-switch threshold energies, and pulse width versus pumping energy have been measured as performance indicators of the Q-switches.

First, the Q-switch performance of the NCs in colloidal solution was checked to be certain that the synthesized NCs were capable of operating as a passive Q-switch, before they were inserted into the polymer matrix. The transmission of the solution was about 90%. The absorption spectrum of the NCs in colloidal solution has the pronounced band around 1540 nm, which indicates that the material is suitable for performance in the operation region of Er:Glass laser.

The results of Q-switch performance measurements of the PbSe NCs in colloidal solution were as follows. The output pulse energy was about 0.8 mJ, FWHM of the output pulse was about 50 ns, and pump threshold was measured at 7J.

Figure 8:
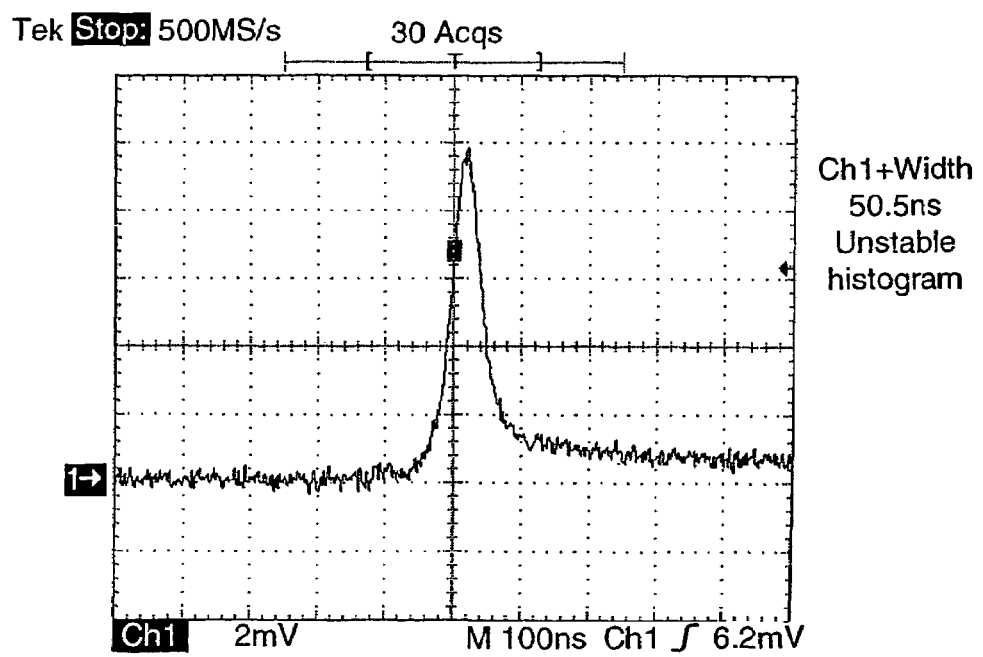
FIG. 8 is a diagram showing an oscilloscope trace of the light output of the laser system as a function of time for a single output pulse, using PbSe nanocrystals in colloidal solution as a Q-switch, prepared according to the method of FIG. 2.

Reference is now made to FIG. 8, which is a diagram showing an oscilloscope trace of the light output of the laser system as a function of time for a single output pulse, using PbSe nanocrystals in colloidal solution as a Q-switch, prepared according to the method of FIG. 2 using oleic acid/TOP for surface passivation.

The PbSe NCs colloidal solution was stable for at least one month and preserved its ability to perform as a Q-switch. The PbSe NCs, which revealed Q-switch activity in the colloidal solution, were used for the preparation of the Q-switch device.

PbSe embedded in polymer film between two glass panes was used for measurements of the Q-switch performance of NCs in polymer media. Pulses with 1.6-2 mJ energy were obtained. Threshold was estimated as 5-7 J. Corresponding free-running output energy was about 12-50 mJ. The pulses with 0.8-2 mJ energy are shown to be feasible.

Next, the PbSe assemblies, prepared in a time lapse between 30 and 45 minutes of the reaction progress according to the process in FIG. 2 when the surface passivation was performed with TOP/TOPO ligands, were taken for Q-switch experiments. The assemblies have pronounced 1,540 nm band in the absorption spectrum. The sample comprised the PbSe assemblies inserted in polymer matrix, having a film shape, and sandwiched between two glass panes. Pulse energies of about 0.2 mJ were obtained with the pumping energy about 12J. The corresponding free running energy was 98 mJ.

Q-switch performance was measured with the core-shell PbSe/PbS NCs embedded in a polymer-matrix. The single Q-switched laser pulse was measured to be 3.5 mJ at an input energy of 8.8 J. The Q-switched laser pulse duration was measured at 40 ns.

The Q-switch performance of the different NCs samples is summarized in Table 1. The Q switching efficiency is defined as the ratio of the Q-switched laser output energy to the free running energy at the same pumping level.

TABLE 1

Results of Q-switching performance test.

| Sample type: | PbSe NCs in colloidal solution | PbSe NC core | $PbSe_xS_{1-x}$ core-shell NCs | PbSe assemblies |
|---|---|---|---|---|
| Transmission at 1540 nm: | 90% | 87.4% | 86.0% | 87% |
| Pumping Energy: | 7 J | 7.5 J | 8.8 J | 12 J |
| Free running Energy: | 45 mJ | 50 mJ | 77 mJ | 98 mJ |
| Laser Output energy with Q-Switch: | 0.8 mJ | 2.0 mJ | 3.5 mJ | 0.2 mJ |
| Pulse FWHM: | 50 ns | 53 ns | 40 ns | |
| Q-switch efficiency: | 1.7% | 4% | 4.5% | 0.2% |

A waveguide in the shape of thin fibers, such as optical fibers, can be prepared, based on the IV-VI semiconductor NCs developed in accordance with the disclosed technique. An optical fiber exploits total internal reflection by having an inner region (i.e., a core) of high refractive index and a cladding of lower index. Light is confined by repeated reflections. Single strands of transparent material can convey trapped light over long distances with very low loss. The NCs may be inserted in a suitable transparent medium (e.g., sol-gel material, fused silica, glass, polymer, and the like), which allows of the refraction index to be controlled. An optical fiber having a core and a cladding of different refraction indexes can be prepared using such NCs inserted in a transparent medium. The thin optical fibers can be drawn from a preform. The preform can be prepared from separate parts for core and cladding, each having a different refraction index and different dopants. Dopants may be placed in either the core or the cladding of the optical fiber. The core may have a cylindrical shape of 0.5-5 mm in diameter and a length of about 50-1,000 mm. The cladding may be a tube shape having outer diameter of 5-50 mm, inner diameter that matches the core, and a length of about 50-1,000 mm. For the final preform preparation, the core is inserted in the cladding tube. Transparent homogenous optical fibers of high optical quality with diameters of 0.1-3.0 mm can be drawn from such a preform. The NCs in a transparent medium may be inserted in the prepared optical fiber.

Optical fibers prepared from the NCs developed in accordance with the disclosed technique can be used in fiber-optic laser systems and fiber-optic communication systems, as a lasing element, a saturable absorber, for suppression of amplified spontaneous emission, for noise suppression, or for spectrum correction and attenuation.

Figure 16:
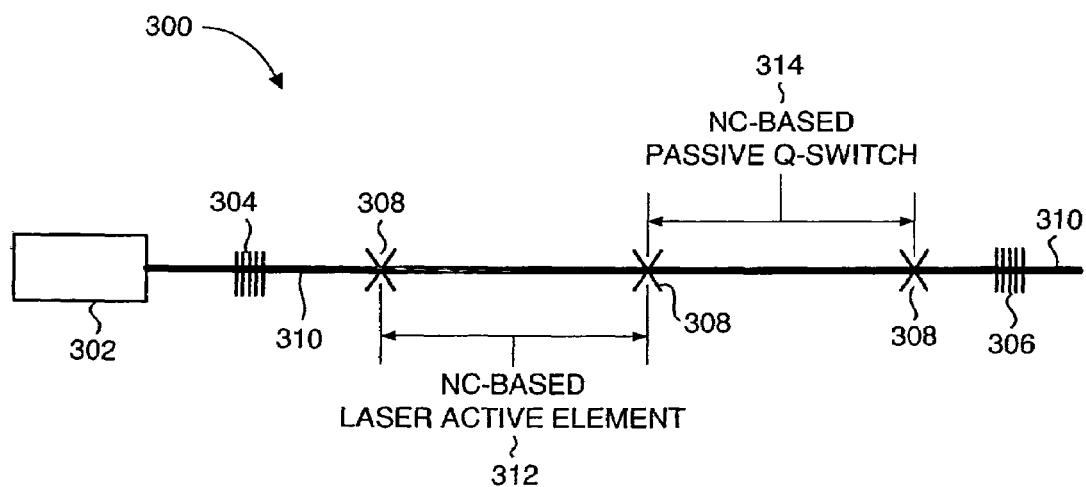
FIG. 16 is a schematic illustration of a fiber-optic laser system, constructed and operative in accordance with a further embodiment of the disclosed technique.

Reference is now made to FIG. 16, which is a schematic illustration of a fiber-optic laser system, generally referenced 300, constructed and operative in accordance with a further embodiment of the disclosed technique. Fiber-optic laser system 300 includes a pumping diode 302, fiber Bragg gratings 304 and 306, splices 308, optical fibers 310, a NC-based laser active element 312, and a NC-based passive Q-switch 314.

Fiber Bragg gratings 304 and 306 serve as reflectors of fiber-optic laser system 300, and together form the fiber laser resonator. The reflectivity of fiber Bragg gratings 304 and 306 is 100% and 4-20%, respectively, at the laser operation wavelength, and less than 1% at the pumping wavelength. The optical fibers of laser system 300 are connected by splicing them together via splices 308. The optical fibers are further coupled to pumping diode 302.

The pumped radiation from pumping diode 302 passes through fiber Bragg gratings 304 and is absorbed in laser active element 312, exciting carriers in the NCs. Spontaneous emission of the NCS is amplified in laser active element 312 and is reflected back and fourth between fiber Bragg gratings 304 and 306. The gain and intensity of radiation in optical fiber 310 increase with pumping, and eventually reaches saturation fluence of the saturable absorber. Losses in passive Q switch 314 are reduced at this point, and the round trip gain of laser system 300 increases significantly above a factor of one. The intensity of intra-cavity radiation increases rapidly, and a high power laser pulse is emitted from fiber-optic laser system 300 through the output via fiber Bragg grating 306.

It will be appreciated by persons skilled in the art that the disclosed technique is not limited to what has been particularly shown and described hereinabove. Rather the scope of the disclosed technique is defined only by the claims, which follow.

The invention claimed is:

1. A passive Q-switch for a laser system operative at the near infrared wavelength region of 700-4,000 nm, said passive Q-switch comprising a saturable absorber comprising IV-VI semiconductor nanocrystals (NCs) embedded in a transparent matrix,
wherein said NCs comprises cores coated with shells having an energy band gap wider than that of the core material.

2. A passive Q-switch according to claim 1, wherein said NCs have a passivated surface.

3. A passive Q-switch according to claim 2, wherein said NCs are surface passivated with organic ligands.

4. A passive Q-switch according to claim 2, wherein said NCs are passivated by capping of organic molecules to their surface, wherein said organic molecules are selected from the list consisting of tributylphosphine (TBP), trioctylphosphine (TOP), TOP-oxide (TOPO), oleic acid, amines, and thiols.

5. A passive Q-switch according to claim 1, wherein said cores comprise lead selenide (PbSe).

6. A passive Q-switch according to claim 1, wherein said shells comprise lead sulfide (PbS).

7. A passive Q-switch according to claim 1, wherein said shells comprise lead selenide sulfide ($PbSe_xS_{1-x}$).

8. A passive Q-switch according to claim 1, wherein said shells comprise materials selected from the list consisting of:
materials with elements of group II-VI; and
materials with elements of group III-V.

9. A passive Q-switch according to claim 8, wherein said materials with elements of group II-VI comprise materials selected from the list consisting of: ZnS, ZnSe, ZnTe, CdS, CdSe, CdTe, HgS, HgSe, HgTe, and MgTe.

10. A passive Q-switch according to claim 8, wherein said materials with elements of group III-V comprise materials selected from the list consisting of: GaN, GaP, GaAs, GaSb, InN, InP, InAs, and InSb.

11. A passive Q-switch according to claim 8, wherein said Q-switch is operative in the eye-safe IR band ranging from 1,300 nm to 1,800 nm.

12. A passive Q-switch according to claim 11, wherein said Q-switch is operative in the wavelength band ranging from 700 nm to 4,000 nm.

13. A passive Q-switch according to claim 1, wherein the diameter of said NCs is in the range of 2-18 nm.

14. A passive Q-switch according to claim 13, wherein the diameter of said NCs is in the range of 4-12 nm.

15. A passive Q-switch according to claim 1, wherein said NCs have a size distribution of less than 10%.

16. A passive Q-switch according to claim 1, wherein said NCs have a size distribution of less than 5%.

17. A passive Q-switch according to claim 1, wherein the shape of said NCs is selected from the list consisting of:
spherical; and
wire-like.

18. A passive Q-switch according to claim 1, wherein the inter-nanocrystal distance of said NCs is 0.6 nm.

19. A passive Q-switch according to claim 1, wherein said transparent matrix is selected from the list consisting of:
polymer;
glass; and
sol-gel.

20. A passive Q-switch according to claim 19, wherein said polymer matrix comprises poly-methyl-methacrylate ([—CH2C(CH3)(CO2CH3)-]n (PMMA).

21. A passive Q-switch according to claim 19, wherein said polymer matrix comprises Poly(vinyl butyral-co vinyl alcohol)n-co-vinyl-acetate (PVB).

22. A passive Q-switch according to claim 1, wherein said transparent matrix embedded NCs are formed in a shape selected from the list consisting of: disks, rods, plates, blocks, fibers, and films.

23. A passive Q-switch according to claim 1, wherein the concentration of the NCs in said transparent matrix is selected to provide 80-90% transmission at the desired operational wavelength.

24. A passive Q-switch according to claim 1, wherein said transparent matrix containing said NCs is sandwiched between mediums.

25. A passive Q-switch according to claim 24, wherein said mediums comprise two glass panes with anti-reflection coated surfaces.

26. A passive Q-switch according to claim 25 wherein the anchoring of said NCs in said transparent matrix between said two glass panes is provided by a UV cured optical adhesive.

27. A passive Q-switch according to claim 25, wherein the surface parallelism of said two glass panes is less than 20 arc second.

28. A passive Q-switch according to claim 24, wherein said mediums comprise layer coatings.

29. A passive Q-switch according to claim 24, wherein said mediums are transparent.

30. A laser system comprising:
a back reflector, reflecting light;
an output coupler, reflecting light;
a pumping cavity, in which light is generated under application of an external stimulus; and
a passive Q-switch for a laser system operative at the near infrared wavelength region of 700-4,000 nm, said passive Q-switch comprising a saturable absorber comprising IV-VI semiconductor NCs embedded in a transparent matrix, wherein said NCs comprise cores coated with shells having an energy band gap wider than that of the core material.

31. A laser system according to claim 30, wherein said system is selected from the list consisting of:
flash-pumped;
diode-pumped; and
optical fiber based.

32. A laser system according to claim 30, wherein said Q-switch is located between said pumping cavity and said back reflector.

33. A laser system according to claim 30, wherein said Q-switch is located between said pumping cavity and said output coupler.

34. A laser system according to claim 30, wherein the output laser pulse energy of said system is 08-2 mJ.

35. A laser system according to claim 30, wherein the threshold energy of said Q-switch is 5-7 J.

36. A laser system according to claim 30, wherein the full width half maximum of duration of the output laser pulse of said system is 20-50 ns.

37. A laser system according to claim 30, wherein said pumping cavity comprises lasable material selected from the list consisting of:
doped crystal;
doped glass;
gas; and
dye.

38. A passive Q-switch according to claim 1, wherein said nanocrystals comprises a core-alloy-shell configuration.

39. A passive Q-switch according to claim 1, wherein said shells are a few monolayers thick.

40. A passive Q-switch according to claim 1, wherein said nanocrystals comprises a rock salt crystal structure.

* * * * *